US012564992B2

(12) United States Patent
     Tanabe et al.

(10) Patent No.: US 12,564,992 B2
(45) Date of Patent: Mar. 3, 2026

(54) LOOSE TUBE-TYPE OPTICAL CABLE PRODUCTION DEVICE AND PRODUCTION METHOD

(71) Applicant: SWCC SHOWA CABLE SYSTEMS CO., LTD., Kawasaki (JP)

(72) Inventors: Kengo Tanabe, Kawasaki (JP); Junya Hasunuma, Kawasaki (JP); Yuki Ota, Kawasaki (JP); Hitoshi Saito, Kawasaki (JP)

(73) Assignee: SWCC SHOWA CABLE SYSTEMS CO., LTD., Kawasaki (JP)

( * ) Notice: Subject to any disclaimer, the term of this patent is extended or adjusted under 35 U.S.C. 154(b) by 424 days.

(21) Appl. No.: 17/849,535

(22) Filed: Jun. 24, 2022

(65) Prior Publication Data

US 2022/0324151 A1     Oct. 13, 2022

Related U.S. Application Data

(63) Continuation of application No. PCT/JP2020/048250, filed on Dec. 23, 2020.

(30) Foreign Application Priority Data

Dec. 27, 2019    (JP) ................................. 2019-238230

(51) Int. Cl.
     *B29C 48/151*        (2019.01)
     *B29C 48/09*         (2019.01)
     (Continued)

(52) U.S. Cl.
     CPC ............ *B29C 48/151* (2019.02); *B29C 48/09* (2019.02); *B29C 48/9115* (2019.02); (Continued)

(58) Field of Classification Search
     CPC .. G02B 6/4483; G02B 6/4486; B29C 48/151; B29C 48/09; B29C 48/9115; B29C 48/92
     See application file for complete search history.

(56) References Cited

U.S. PATENT DOCUMENTS

| | | | |
|---|---|---|---|
| 5,312,499 A | 5/1994 | Bolick et al. | |
| 2004/0208462 A1 | 10/2004 | Parsons et al. | |

(Continued)

FOREIGN PATENT DOCUMENTS

| | | |
|---|---|---|
| JP | S53-008788 A | 1/1978 |
| JP | S63-066517 A | 3/1988 |

(Continued)

OTHER PUBLICATIONS

Office Action issued May 20, 2024 by Korean Patent Office in corresponding Korean Patent Application No. 2022-7024094 (including English translation).

*Primary Examiner* — Joseph S Del Sole
(74) *Attorney, Agent, or Firm* — Harness, Dickey & Pierce, P.L.C.

(57) ABSTRACT

There is disclosed a production device for a loose tube-type optical cable in which an optical fiber bundle is housed in a tube. The production device includes: a resin extruder configured to extrude and coat a resin onto the optical fiber bundle; and a water tank configured to store cooling water for cooling the resin to form the tube, wherein: the resin extruder includes: an extruder die having an extrusion port for the resin; a pipe penetrating the extruder die; and an air pump mechanism configured to pump air to the pipe; and the water tank includes: a sizing die having an inlet, a passage port, and a suction port for the cooling water; and a cooling water suction mechanism configured to suck the cooling water from the sizing die.

9 Claims, 5 Drawing Sheets

1

(51) Int. Cl.
    *B29C 48/88*         (2019.01)
    *B29L 11/00*         (2006.01)
    *G02B 6/44*          (2006.01)

(52) U.S. Cl.
    CPC ......... *G02B 6/4483* (2013.01); *G02B 6/4486*
         (2013.01); *B29K 2995/0094* (2013.01); *B29L*
                          *2011/0075* (2013.01)

(56)            References Cited

U.S. PATENT DOCUMENTS

| | | | |
|---|---|---|---|
| 2010/0247045 A1 | 9/2010 | Okada et al. | |
| 2011/0244067 A1* | 10/2011 | Matsuda | ............. B29C 48/2665 |
| | | | 425/72.1 |
| 2013/0249148 A1* | 9/2013 | Matsushima | ......... B29C 48/908 |
| | | | 264/573 |
| 2016/0299311 A1* | 10/2016 | Kaji | .................... G02B 6/4486 |

FOREIGN PATENT DOCUMENTS

| | | | |
|---|---|---|---|
| JP | H01-224712 A | 9/1989 | |
| JP | H02-177219 A | 7/1990 | |
| JP | H04-128825 U | 11/1992 | |
| JP | H08-336887 A | 12/1996 | |
| JP | 2006-058774 A | 3/2006 | |
| JP | 2007-538287 A | 12/2007 | |
| JP | 2009-116240 A | 5/2009 | |
| KR | 20040078874 | 9/2004 | |
| WO | WO-0060393 A1 * | 10/2000 | ........... G02B 6/4413 |

\* cited by examiner

LOOSE TUBE-TYPE OPTICAL CABLE PRODUCTION DEVICE AND PRODUCTION METHOD

CROSS REFERENCE TO RELATED APPLICATION

The present application is a continuation application of International Application No. PCT/JP2020/048250, filed Dec. 23, 2020. The contents of this application are incorporated herein by reference in their entirety.

FIELD

The present invention relates to a loose tube-type optical cable production device and production method.

BACKGROUND

A loose tube-type optical cable basically has a configuration in which many optical fibers (optical fiber bundles) are covered with a tube. In the loose tube-type optical cable, the optical fiber bundles and the tube need to move relative to each other to some extent in order to absorb bending, and when a tensile force is applied to the cable itself, the optical fiber needs to be prevented from displacing in the tube. In Patent Document 1, a dry insert layer (14) is disposed between an optical waveguide (12) and a tube (18) to solve the problems (see paragraph 0007, FIG. 1 and so on).

However, the technique of Patent Document 1 needs the dry insert layer and a polyester binder thread (17) for holding the dry insert layer, the existence of those members may cause flatness (becoming non-circle) recognized in the cross-section shape and creases formed on the tube surface, and therefore it may be impossible to absorb the bending and prevent the displacement due to the tensile force.

Therefore, a main object of the present invention is to provide a production device and production method for a loose tube-type optical cable that has no flatness in the cross-section shape thereof (close to a circle) and no creases formed on the surface of the tube.

To solve the above problem, one aspect of the present invention provides a production device for a loose tube-type optical cable in which an optical fiber bundle is housed in a tube, the production device including:

a resin extruder configured to extrude and coat a resin onto the optical fiber bundle; and a water tank configured to store cooling water for cooling the resin to form the tube, wherein:

the resin extruder includes: an extruder die having an extrusion port for the resin; a pipe penetrating the extruder die; and an air pump mechanism configured to pump air to the pipe; and the water tank includes: a sizing die having an inlet, a passage port, and a suction port for the cooling water; and a cooling water suction mechanism configured to suck the cooling water from the sizing die.

Another aspect of the present invention provides a production method for a loose tube-type optical cable using a production device for a loose tube-type optical cable in which an optical fiber bundle is housed in a tube, the production device including:

a resin extruder configured to extrude and coat a resin onto the optical fiber bundle; and a water tank configured to store cooling water for cooling the resin to form the tube, wherein:

the resin extruder includes: an extruder die having an extrusion port for the resin; a pipe penetrating the extruder die; and an air pump mechanism configured to pump air to the pipe; and the water tank includes: a sizing die having an inlet, a passage port, and a suction port for the cooling water; and a cooling water suction mechanism configured to suck the cooling water from the sizing die, the production method including:

extruding the resin from the extrusion port of the extruder die to the optical fiber bundle while pumping the air from the pipe by operating the air pump mechanism; and hardening the resin while circulating the cooling water from the inlet through the passage port to the suction port of the sizing die by operating the cooling water suction mechanism.

According to the present invention, it is possible to produce a loose tube-type optical cable that has no flatness in the cross-section shape thereof (close to a circle) and no creases formed on the surface of the tube.

DETAILED DESCRIPTION

Hereinafter, a loose tube-type optical cable and a production device and a production method thereof according to a preferred embodiment of the present invention will be explained. Note that regarding the expression of "-(to)" indicating a numerical range, the lower limit value and the upper limit value are included in the numerical range in this description.

Figure 1:
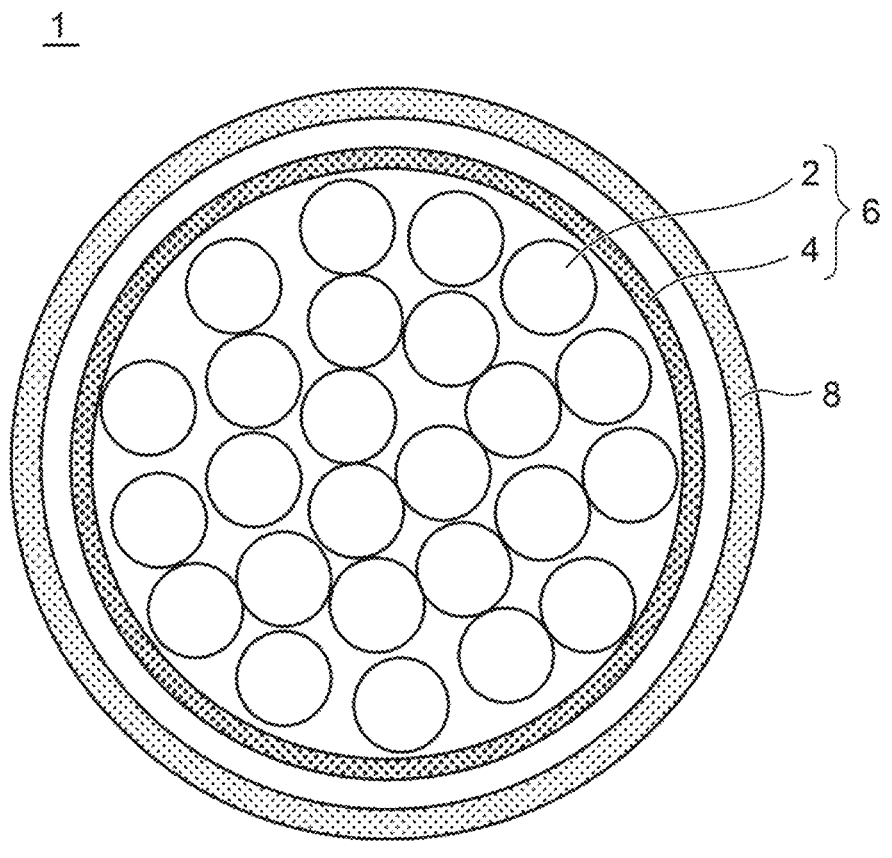
FIG. 1 is a cross-sectional view illustrating a schematic configuration of a loose tube-type optical cable.

[Loose tube-type optical cable] FIG. 1 is a cross-sectional view illustrating a schematic configuration of a loose tube-type optical cable 1. As illustrated in FIG. 1, the loose tube-type optical cable 1 has an optical fiber core 6 made by covering many optical fibers (optical fiber bundles 2) with a wrapping tape 4, and has a configuration in which the optical fiber core 6 is covered with a tube 8. In the loose tube-type optical cable 1, the optical fiber core 6 is loosely housed in the tube 8. The wrapping tape 4 is composed of a nonwoven fabric. The tube 8 is composed of high density polyethylene (HDPE), polybutylene terephthalate (PBT), polyester elastomer, polypropylene, nylon, ethylene tetrafluoro ethylene (ETFE), polyvinylidene difluoride (PVDF) or the like. In the above loose tube-type optical cable 1, the pull-out force at a length of 1 m of the optical fiber bundle 2 is 3 N or less. The "pull-out force" is a measured value measured using a pull-out force test, and is a value obtained by measuring a force (N) required for the optical fiber bundle 2 to start to move from the loose tube-type optical cable 1 having a length of 1 m.

Figure 2:
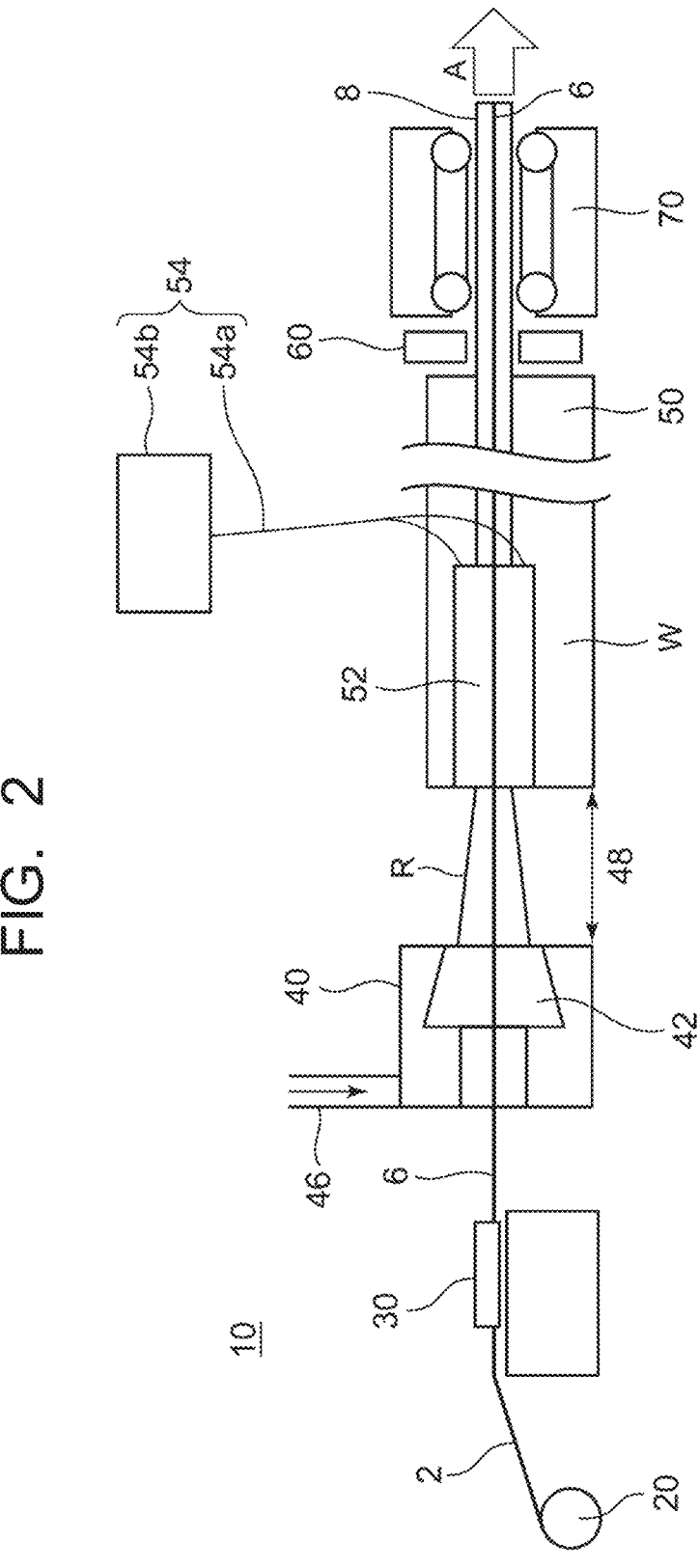
FIG. 2 is a diagram illustrating a schematic configuration of a loose tube-type optical cable production device.

[Loose Tube-type Optical Cable Production Device and Production Method] (1) A loose tube-type optical cable production device. FIG. 2 is a diagram illustrating a schematic configuration of the loose tube-type optical cable production device. As illustrated in FIG. 2, the loose tube-type optical cable production device 10 has a drum 20 around which the optical fiber bundles 2 are wound, and is configured such that the optical fiber bundles 2 are taken up from the left to the right in FIG. 2. In a take-up direction A of the optical fiber bundles 2, a tape former 30, a resin extruder 40, a water tank 50, an outer diameter measuring device 60, and a take-up device 70 are arranged in order so that the optical fiber bundles 2 pass through those devices to form into the optical fiber core 6 and the tube 8.

The tape former 30 is a device which vertically attaches the wrapping tape 4 to the optical fiber bundles 2, so that when the optical fiber bundles 2 pass through the tape former 30, the wrapping tape 4 is vertically attached to the optical fiber bundles 2 to form the optical fiber core 6.

Figure 3:
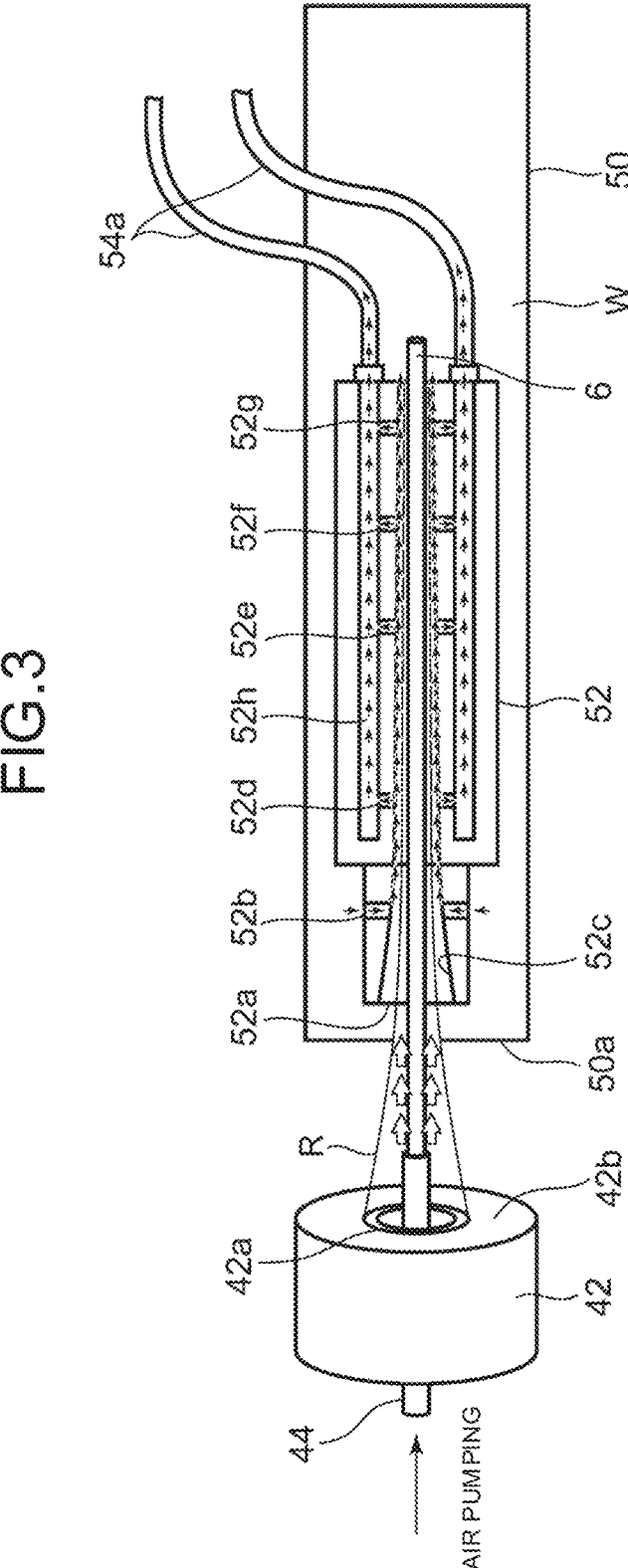
FIG. 3 is a view for explaining configurations of a resin extruder and a water tank.

The resin extruder 40 is a device which extrudes and coats the resin R onto the optical fiber core 6, so that when the optical fiber core 6 passes through the resin extruder 40, the resin R is extruded and coated on the optical fiber core 6. As illustrated in FIG. 2 and FIG. 3, the resin extruder 40 is mainly composed of an extruder die 42, a pipe 44, and an air pump mechanism 46. The extruder die 42 is formed with an extrusion port 42*a* for the resin R having a circular shape. At a center portion of the extrusion port 42*a* of the extruder die 42, the pipe 44 is inserted. The pipe 44 penetrates the extruder die 42 so that the optical fiber core 6 passes through the inside of the pipe 44. The inner diameter of the pipe 44 is smaller than the inner diameter of the tube 8, and the tip portion of the pipe 44 projects from an exit surface 42*b* of the extruder die 42. In the resin extruder 40, the resin R is extruded from the extrusion port 42*a* to the optical fiber core 6 passing through the pipe 44, so that the optical fiber core 6 is coated with the resin R.

The resin extruder 40 is provided with the air pump mechanism 46 (FIG. 2) for pumping air to the pipe 44. When the air pump mechanism 46 is operated, air (atmospheric air) is pressure-fed to the pipe 44, and a fixed gap is formed between the optical fiber core 6 passing through the pipe 44 and the extruded resin R to prevent the optical fiber core 6 and the resin R from coming into close contact with each other.

Cooling water W for cooling the resin R is stored in the water tank 50 so as to harden the resin R extruded from the extruder die 42. As illustrated in FIG. 3, the sizing die 52 and the cooling water suction mechanism 54 are mainly installed in the water tank 50. The sizing die 52 is a die having an almost rectangular parallelepiped shape, and its length along the take-up direction A is equal to or more than 10 times the outer diameter of the tube 8. The sizing die 52 is formed with inlets 52*a*, 52*b*, a passage port 52*c*, and suction ports 52*d* to 52*g* for the cooling water W. The passage port 52*c* has a circular cross-sectional shape so that the optical fiber core 6 passes through the inside of the passage port 52*c*. The entrance of the passage port 52*c* is slightly wide, and the passage port 52*c* becomes gradually narrow along the take-up direction A and keeps a fixed diameter from the middle to the exit of the passage port 52*c*. At the entrance of the passage port 52*c*, the inlets 52*a*, 52*b* for injecting the cooling water W are formed. From the middle to the exit of the passage port 52*c*, the suction ports 52*d* to 52*g* for sucking the cooling water W are formed. In the example in FIG. 3, the inlets 52*b* in one set are formed at the right and left (in the horizontal direction) and the suction ports 52*d* to 52*g* in four sets are each formed at the right and left (in the horizontal direction). The distance between the first suction port 52*d* and the second suction port 52*e* is larger than the distance between the second suction port 52*e* and the third suction port 52*f*. The distance between the second suction port 52*e* and the third suction port 52*f* and the distance between the third suction port 52*f* and the fourth suction port 52*g* are the same. The sizing die 52 is formed with a communication port 52*h* along the take-up direction A, and the suction ports 52*d* to 52*g* are communicated with one another in the communication port 52*h*.

The communication port 52*h* of the sizing die 52 is provided with the cooling water suction mechanism 54 for sucking the cooling water W from the sizing die 52. The cooling water suction mechanism 54 is mainly composed of a suction tube 54*a* and a pump 54*b*, and the suction tube 54*a* is connected to the communication port 52*h*. When the pump 54*b* of the cooling water suction mechanism 54 is operated, the cooling water W in the water tank 50 circulates from the inlets 52*a*, 52*b* through the passage port 52*c* to the suction ports 52*d* to 52*g* and is sucked through the communication port 52*h*. The suction pressure in the cooling water suction mechanism 54 is set to a vacuum pressure, and the suction pressure is preferably −100 to −20 kPa.

Note that the sizing die 52 is submerged in the cooling water W in the water tank 50, and the entrance of the sizing die 52 is arranged on the downstream side in the take-up direction A from the entrance of the water tank 50. How far downstream the entrance of the sizing die 52 is arranged from the entrance of the water tank 50 only needs to be adjusted by the kind of the resin R, the pressure of the air, the temperature of the cooling water W or the like. The respective distances between the suction ports 52*d* to 52*g* and the numbers of the suction ports are also changeable and only need to be set in consideration of the kind of the resin R, the pressure of the air, the temperature of the cooling water or the like. For example, in the case where the tube 8 is constituted of an HDPE resin R, the HDPE resin R is likely to harden with the cooling water W, and therefore the first, second, and fourth suction ports 52*d*, 52*e*, and 52*g* are formed and then they only need to be arranged at regular intervals. In the case where the tube 8 is constituted of a PBT resin R, the PBT resin R is less likely to harden with the cooling water W than the HDPE resin R, and therefore all of the first to fourth suction ports 52*d* to 52*g* are formed so that the suction ports are increased in number at the exit portion of the sizing die 52. The sizing die 52 may be divided into two or more along the take-up direction A, and each sizing die may circulate the cooling water W to form the tube 8.

The outer diameter measuring device 60 which measures the outer diameter of the optical fiber core 6 coated with the resin R (loose tube-type optical cable 1) is installed downstream from the water tank 50 in the take-up direction A and measures whether the outer diameter of the loose tube-type optical cable 1 satisfies certain specifications, and the loose tube-type optical cable 1 is finally taken up by the take-up device 70.

Figure 4:
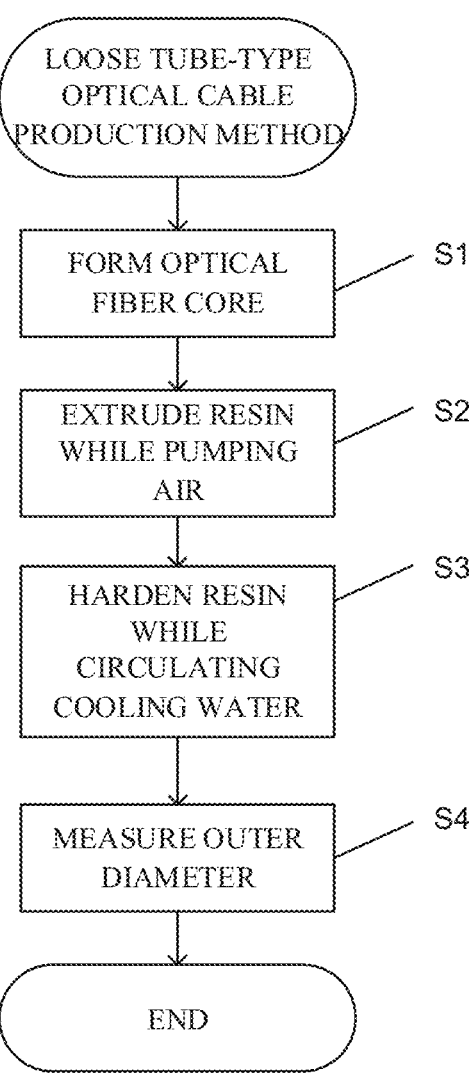
FIG. 4 is a flowchart illustrating the outline of a loose tube-type optical cable production method.

(2) A loose tube-type optical cable production method. FIG. 4 is a flowchart illustrating the outline of the loose tube-type optical cable production method. In a state where the optical fiber bundles 2 are taken up by the take-up device 70 from the drum 20 and the optical fiber bundles 2 are transported along the take-up direction A, the air pump mechanism 46 and the cooling water suction mechanism 54 are operated. In this state, the tape former 30 first vertically attaches the nonwoven fabric to the optical fiber bundles 2 to thereby cover them with the wrapping tape 4, thereby forming the optical fiber core 6 (S1). Thereafter, the resin extruder 40 extrudes the resin R from the extrusion port 42*a* of the extruder die 42 to the optical fiber core 6 while pumping air from the pipe 44 and coats the resin R onto the optical fiber core 6 (S2). Thereafter, the resin R is hardened while the cooling water W is being circulated in the water tank 50 from the inlets 52*a*, 52*b* through the passage port 52*c* to the suction ports 52*d* to 52*g* of the sizing die 52, thereby forming the tube 8 (S3). Thereafter, the outer diameter measuring device 60 measures the outer diameter of the loose tube-type optical cable 1, and the take-up device 70 takes up the loose tube-type optical cable 1 (S4).

According to the above embodiment, the fixed gap (gap 48) is formed between the exit surface 42*b* of the extruder die 42 and an entrance surface 50*a* of the water tank 50 and the air is pressure-fed to the pipe 44, so that an inner wall portion of the tube 8 is formed into a circular shape with the fixed gap formed between the optical fiber core 6 and the resin R, and these are transported to the sizing die 52 of the water tank 50. In the sizing die 52, the cooling water W circulates through the inlets 52*a*, 52*b*, the passage port 52*c*, and the suction ports 52*d* to 52*g* of the sizing die 52, so that the cooling water W flows to slide between the resin R and the inner surface of the passage port 52*c* of the sizing die 52, whereby an outer wall portion of the tube 8 is formed into a circular shape. In other words, in this embodiment, in the state where the gap is formed between the optical fiber core 6 and the resin R by the pumping of air, the resin R is hardened while the gap is being kept by the circulation of the cooling water W, so that the loose tube-type optical cable 1 that has no flatness in the cross-section shape thereof (as close as possible to a circle) and no creases formed on the surface of the tube 8 can be produced, resulting in absorption of bending and prevention of displacement due to tensile force.

Figure 5:
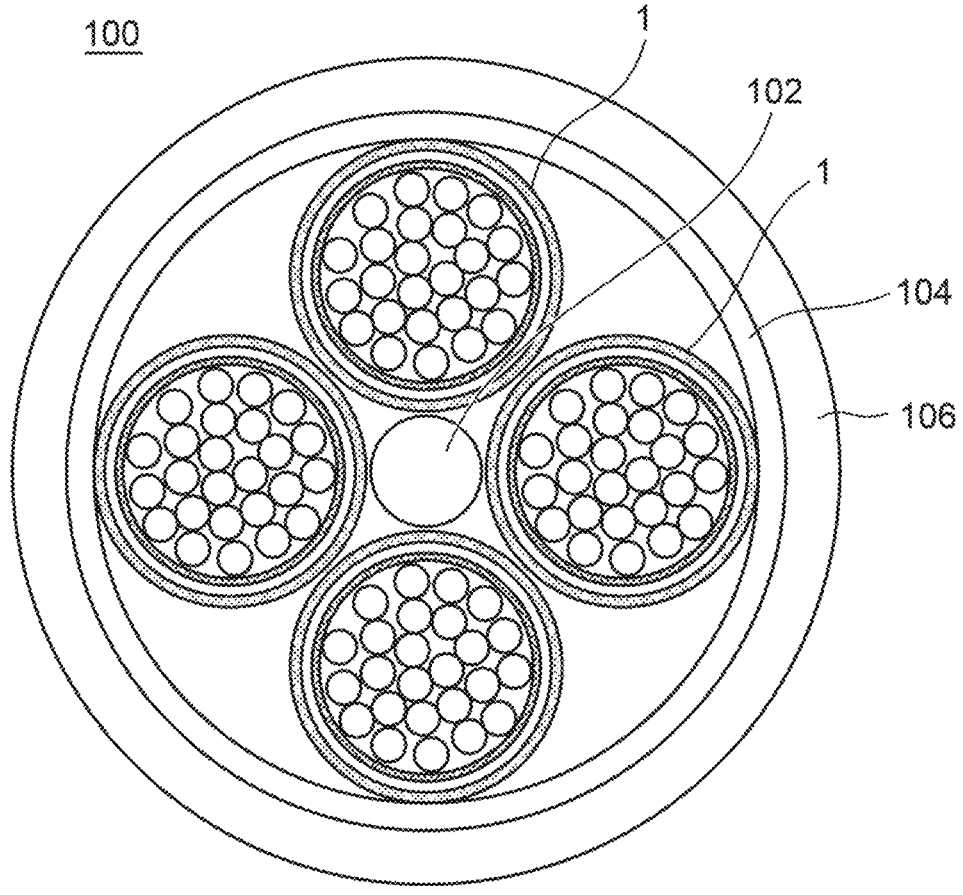
FIG. 5 is a sectional view illustrating a schematic configuration of a loose tube-type optical cable of a multicore structure.

Note that the production of the loose tube-type optical cable 1 is mentioned in this embodiment, it is also possible to produce a loose tube-type optical cable 100 of a multicore structure by twisting a plurality of loose tube-type optical cables 1 together around a tension member 102, wrapping them with a wrapping tape 104, and covering them with a wrapping sheath 106 as illustrated in FIG. 5.

The invention of the present application relates to a loose tube-type optical cable production device and production method, and is useful in producing a loose tube-type optical cable that has no flatness in the cross-section shape thereof (close to a circle) and no creases formed on the surface of the tube.

What is claimed is:

1. A production device for a loose tube-type optical cable in which an optical fiber bundle is housed in a tube, the production device comprising:

a resin extruder configured to extrude and coat a resin onto the optical fiber bundle; and a water tank configured to store cooling water for cooling the resin to form the tube, wherein:

the resin extruder comprises: an extruder die having an extrusion port for the resin; a pipe penetrating the extruder die; and an air pump mechanism configured to pump air to the pipe; and the water tank comprises: a sizing die having an inlet, a passage port, and a suction port for the cooling water; and a cooling water suction mechanism configured to suck the cooling water from the sizing die wherein the sizing die is within the water tank, and the inlet, the passage port and the suction port are in fluid communication so as to be operable that cooling water in the water tank circulates from the inlets, through the passage port, to the suction port.

2. The production device of the loose tube-type optical cable according to claim 1, wherein an inner diameter of the pipe is smaller than an inner diameter of the tube.

3. The production device of the loose tube-type optical cable according to claim 1, wherein a tip portion of the pipe projects from an exit surface of the extruder die.

4. The production device of the loose tube-type optical cable according to claim 1, wherein a length of the sizing die is equal to or more than 10 times an outer diameter of the tube.

5. The production device of the loose tube-type optical cable according to claim 1, wherein a suction pressure in the cooling water suction mechanism is −100 to −20 kPa.

6. The production device of the loose tube-type optical cable according to claim 1, wherein the sizing die is divided into two or more.

7. A production method for a loose tube-type optical cable using a production device for a loose tube-type optical cable in which an optical fiber bundle is housed in a tube, the production device comprising:

a resin extruder configured to extrude and coat a resin onto the optical fiber bundle; and a water tank configured to store cooling water for cooling the resin to form the tube, wherein:

the resin extruder comprises: an extruder die having an extrusion port for the resin; a pipe penetrating the extruder die; and an air pump mechanism configured to pump air to the pipe; and the water tank comprises: a sizing die having an inlet, a passage port, and a suction port for the cooling water; and a cooling water suction mechanism configured to suck the cooling water from the sizing die, the production method comprising:

extruding the resin from the extrusion port of the extruder die to the optical fiber bundle while pumping the air from the pipe by operating the air pump mechanism; and hardening the resin while circulating the cooling water from the inlet through the passage port to the suction port of the sizing die by operating the cooling water suction mechanism.

8. The production device of claim 1, further comprising a tape former.

9. The production method of claim 7, wherein the production device further comprises a tape former, and the production method further comprises attaching wrapping tape to the optical fiber bundle before the extruding of the resin.

\* \* \* \* \*